Oct. 16, 1951  F. A. PACHMAYR ET AL  2,571,935
TELESCOPIC SIGHT MOUNT
Filed May 10, 1946

INVENTOR
FRANK A. PACHMAYR
ROGER H. STOKES
BY HARRIS, KIECH, FOSTER & HARRIS
FOR THE FIRM
ATTORNEYS

Patented Oct. 16, 1951

2,571,935

UNITED STATES PATENT OFFICE 2,571,935

TELESCOPIC SIGHT MOUNT

Frank A. Pachmayr, Culver City, and Roger Howard Stokes, Los Angeles, Calif.

Application May 10, 1946, Serial No. 668,940

6 Claims. (Cl. 33—50)

Our invention relates to a mount for attaching conventional telescopic gun sights to firearms and a primary objective thereof is to provide a mount which is adapted to permit repeated installation or removal of the telescopic sight without impairing the accuracy of alignment thereof relative to the longitudinal axis of the barrel of the firearm.

Accurate alignment of the line of sight of the telescope with respect to the bore of the gun is of paramount importance if the desired accuracy of fire is to be achieved under all conceivable operating conditions. Furthermore, the mount must be sufficiently rigid to ensure that the required accuracy of alignment is maintained under all normal conditions of operation and that the prescribed degree of alignment will be duplicated repeatedly despite frequent removal or installation of the telescopic sight.

In the past, conventional telescopic gun sight mounts have largely relied upon the action of dovetail or mortise and tenon joints and set screws in attempts to preserve accurate alignment. Our experience has indicated that mounts of this general character are frequently unsatisfactory, perhaps principally because of the rather large accurately-machined surfaces required by joints of this nature. Such conventional joints, which may be perfect initially, appear to be subject to rapid wear and are therefore incapable of preserving the high degree of accuracy required for any appreciable length of time. Telescopic sights are subject to frequent removal and installation during normal use thereof and conventional dovetail or mortise and tenon joints frequently do not permit repeated duplication of the prescribed line of sight.

Other conventional mounts employ cylindrical journals to provide a pivotal interconnection between the gun and telescopic sight. Connections of this character are subject to similar inherent disadvantages, since any discrepancies between the shaft and bearing diameters result in variations of alignment. These alignment variations are magnified appreciably as wear increases the play in the journals with a resultant loss of firing accuracy.

In view of these considerations, another primary objective of our invention is the provision of a mount adapted to overcome the inherent disadvantages of conventional mounts and we prefer to effect a realization of this objective by providing a pivotal mount which includes a centering means adapted to compensate automatically for wear of the pivotal supports. We contemplate the employment of a base member which may be rigidly secured to the receiver of a gun, a carriage member adapted to receive and retain a telescopic sight in a positive and reliable manner, and a centering means carried by one of the members for pivotally interconnecting the base and carriage members. We prefer to employ a centering means which incorporates a conical journal adapted for rotation within a complementary bearing and to provide a means for adjusting the bearing load by axial displacement of the centering means to compensate for wear.

Another objective of our invention is the provision of a telescopic sight mount which may be installed without removal of the conventional iron sights and which may be rotated to one side of the barrel substantially instantaneously to permit clip-loading of the gun and to permit employment of the iron sights. The importance of this objective will be recognized by those who use rifles for hunting purposes, since a telescopic sight is useless for rapid firing at a moving object at extreme close range. Retention of the iron sights is also essential in the event that the telescopic sight is damaged or unusable due to rain or snow. Conventional sight mounts ordinarily do not permit ready displacement of the telescopic sight, are not adapted for quick removal, and require an inordinate amount of time to effect installation or removal thereof. The provision of a readily removable telescopic sight mount is another salient feature of our invention, as this permits the telescopic sight to be carried separate from the gun in a safe carrying case yet permits it to be quickly mounted on the gun when the need therefor arises.

An additional objective of our invention is the provision of a readily releasable means for maintaining the telescopic sight over the center of the barrel in the desired position for normal operation.

An exemplary embodiment of a telescopic sight mount adapted for effecting a realization of these and various other objectives and advantages of our invention will be described in detail hereinafter and is shown in the accompanying drawing, which is for illustrative purposes only, wherein.

Figure 2:
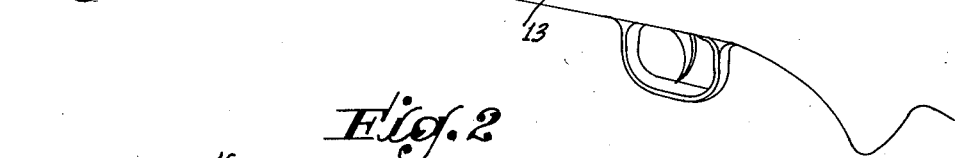
Fig. 2 is a side elevational view of the mount with part of the telescope shown in phantom.
Figure 3:
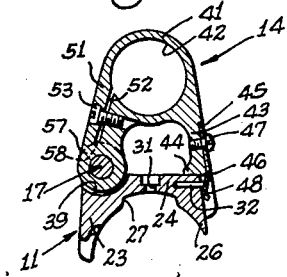
Figure 6:
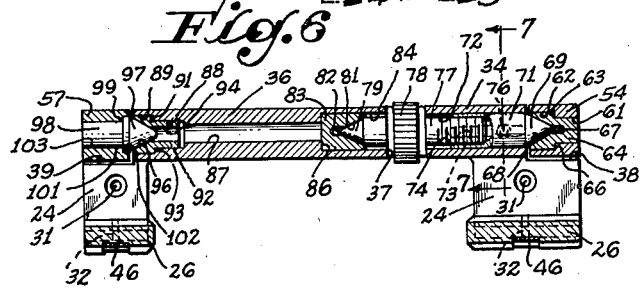
Figures 4, 5:
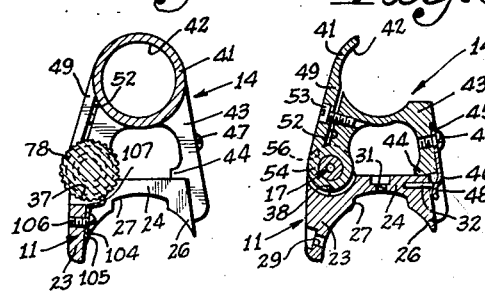
Figure 7:
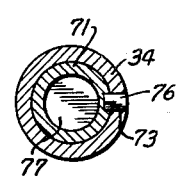

Figs. 3, 4, and 5 represent vertical sections through the mount and taken along the lines 3—3, 4—4, and 5—5, respectively, of Fig. 2;

Fig. 6 represents a horizontal section through the mount and taken as indicated by the line 6—6 of Fig. 2; and Fig. 7 is a fragmentary sectional view taken as indicated by the line 7—7 of Fig. 6.

The telescopic sight mount, indicated generally by the numeral 10, includes a base member 11, which is rigidly attached to the receiver 12 of a conventional rifle 13, and a carriage member 14, which is rigidly secured to a conventional telescopic sight 16, the base member 11 and carriage member 14 being pivotally interconnected by a bearing assembly 17 whose axis is preferably parallel to the bore of the rifle 13. The rifle 13, which may be of any desired make or model, is of the bolt action type and is provided with a conventional rear iron sight 18. The telescope 16, which also may be of any desired make or model, includes a barrel 19 and an eye-piece 21 and is provided with knurled knobs 22 for adjusting the position of the rear cross-hairs thereof (not shown) to effect the desired relationship between the line of sight of the telescope 16 and bore of the rifle 13 in the conventional manner.

Figure 1:
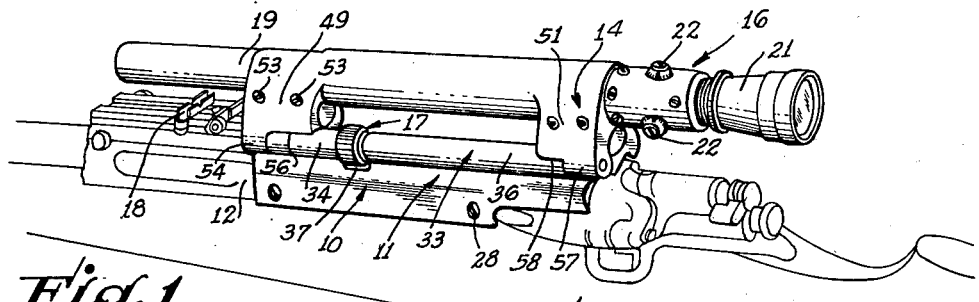
Fig. 1 is a perspective view illustrating an application of the telescopic sight mount to a conventional telescope and rifle.

The base member 11 is preferably of the single-piece bridge-type construction illustrated and includes a continuous, longitudinally-oriented flange 23 and longitudinally-spaced central sections 24 and flanges 26 which cooperate to define a longitudinal recess 27, the latter being complementary to and adapted to embrace the receiver 12 of the rifle 13. The base 11 is attached to the receiver 12 by means of screws 28 which are threaded thereinto through holes 29 in the flange 23 and by means of additional screws (not shown) which can extend through counterbored holes 31 in the central sections 24 into threaded engagement with the receiver 12, so as to rigidly fix the base to the receiver. The flanges 26 are each provided with a projecting latch pin 32 whose function will be described hereinafter. Formed integrally with the base 11 and disposed adjacent the upper edge of the flange 23 is a longitudinally-oriented tubular member 33 which contains the bearing assembly 17 and which is divided into two axially aligned tubular sections 34 and 36 by an arcuate groove 37, the latter being concentric therewith. The groove 37 extends downwardly through the tubular member 33 of the base member 11 into the body of the base member to divide the tubular member 33 into the axially aligned tubular sections 34 and 36. The groove 37 is concentric with the tubular member 33 to receive a knurled element 78 which will be discussed in more detail hereinafter. This relation is best shown in Fig. 1 of the drawing. The base 11 is also provided with a counterbore 38 adjacent the forward end of the tubular section 34 and a similar counterbore 39 adjacent the rearward end of the tubular section 36, the counterbores 38 and 39 being concentric with the tubular member 33 and performing a function which will be described in detail hereinafter.

The carriage member 14, which is pivotally attached to the base 11 by the bearing assembly 17 in a manner which will be described later, is of the bridge type and includes a longitudinally-oriented tubular section 41 which is provided with a bore 42 therein for the reception of the barrel 19 of the telescope 16. The right side of the tubular section 41 as seen in Fig. 3, is provided with a pair of supporting standards 43 having inwardly directed projections 44 which are adapted for engagement with the upper surface of the central sections 24 of the base 11 as illustrated in Figs. 3 to 5, inclusive. The standards 43 are provided with spring clips 46 which are disposed in grooves 45 and attached to the standards 43 by screws 47, the lower ends 48 of the spring clips 46 being adapted for engagement with the latch pins 32 in the base 11 to latch the carriage 14. The left side of tubular section 41, as seen in Fig. 3, is provided with a pair of clamping standards 49 and 51, each of which is provided with a slot 52 therein, the slots 52 being traversed by screws 53 which are adapted to vary the width thereof and hence the diameter of the bore 42 and clamping force applied to the barrel 19 of the telescope 16. The forward clamping standard 49 terminates in a cylindrical segment 54 which is adapted for reception by the counterbore 38 at the forward end of the tubular section 34 of the base member 11, the standard 49 further being provided with a concentric counterbore 56 adjacent the rearward end of the cylindrical segment 54 which is adapted to receive the tubular section 34 therein as best shown in Figure 1. The rearward clamping standard 51 similarly terminates in a cylindrical segment 57 which is adapted for reception by the counterbore 39 at the rearward end of the tubular section 36 and is provided with a similar counterbore 58 at the forward end of the cylindrical segment 57 for the reception of the tubular section 36 therein.

The cylindrical segment 54 of the forward clamping standard 49, the cylindrial segment 57 of the rearward clamping standard 51, and the tubular sections 34 and 36 of the base member 11 cooperate to define the basic components of the housing of the bearing assembly 17 and all are in axial alignment. The verious auxiliary components of the bearing assembly 17 to be described hereinafter are also in axial alignment with the aforesaid basic components and with each other. Furthermore, all of the various bores and counterbores to be described are all concentric and coaxial and therefore all references to alignment and concentricity will be omitted from the subsequent description of the bearing assembly 17 to simplify the disclosure thereof.

The cylindrical segment 54 of the forward clamping standard 49 is provided with a bore 61 and concentric opening 62 which cooperate to define a shoulder 63, the opening 62 preferably being square. Disposed within the bore 61 and counterbore 62 is a complementary bearing 64 having a shoulder 66 which is complementary to and abuts the shoulder 63 to provide a rigid thrust support. The bearing 64 is provided with a cylindrical bore 67 which communicates with a conical counterbore 68, the latter defining a bearing surface. Journaled in the conical bearing 68 is the complementary conical end 69 of a tubular plunger 71 which is axially slidable in a bore 72 in the tubular section 34. The tubular plunger 71 is provided with a slot 73 which communicates with the interior 74 thereof, the slot 73 serving to permit axial displacement and to prevent rotation thereof by virtue of the keying action of a screw 76 which is threaded into the base 11 and extends into the slot 73. One end of a shaft 77 is threaded into the interior 74 of the plunger 71 and is rotatable relative thereto by means of a knurled collar 78 which is secured to the shaft 77, the collar 78 being disposed in the previously mentioned arcuate groove 37 which divides the tubular sections 34 and 36. The opposite end of the shaft 77 provides a conical journal 79 which extends into a conical bore 81 and cylindrical bore 82 in a bearing 83, the latter being disposed in a concentric opening 84 in the tubular section 36. The bearing 83 is disposed in the counterbore 84 in contact with shoulder 86 to provide a rigid support for thrust loads which are required to displace the plunger 71 axially, the shoulder 86 being defined by the cooperation of the opening 84 and a bore 87 in the tubular section 36. The bore 87 terminates in additional concentric openings 88 and 89 which cooperate to define a shoulder 91, the openings 88 and 89 having a complementary bearing 92 therein which is provided with a shoulder 93 thereon to engage the shoulder 91 and provide a rigid thrust support. The bearing 92 is provided with a bore 94 which communicates with the bore 87 and a conical counterbore 96 which acts as a bearing surface for a complementary conical journal 97. The latter forms part of a shaft 98 having a shoulder 99 thereon which is adapted to abut a shoulder 101 which is defined by an opening 102 and bore 103 in the cylindrical segment 57 of the rearward clamping standard 51. Rotation of the knurled collar 78 is preferably restrained by means of a spring clip 104 which is disposed in a groove 105 in the flange 23 of the base 11 and secured thereto by a screw 106. The upper end 107 of the spring clip 104 is adapted for engagement with the serrations of the collar 78 to resist rotation thereof.

The carriage 14 may be rotated relative to the base 11 about the axis of rotation of the bearing assembly 17 to permit employment of either the telescopic sight 16, or the iron sight 18. Since the base 11 is rigidly attached to the rifle 13 and the carriage 14 is rigidly connected to the telescope 16, it will be apparent that the prescribed relationship between the bore of the rifle 13 and the line of sight of the telescope 16 will obtain as long as the axis of rotation of the carriage 14 coincides with the axis of the tubular member 33 of the base 11. The conical bearings 68—69 and 96—97 act as a centering means to insure the attainment and maintenance of the desired coaxiality. Rotation of the knurled collar 78 effects axial displacement of the plunger 71 to increase or decrease the thrust loads sustained by the various conical bearings and it will be apparent that as the conical journals 69 and 97 engage the complementary bearing surfaces 68 and 96, respectively, more intimately, the axis of the former becomes coincident with the axis of the latter. When the carriage 14 is in normal operating position as illustrated, the engagement of the spring clips 46 with the latch pins 32 serves to retain the carriage 14 in that position. The knurled collar 78 may be rotated to increase the bearing thrust loads to a sufficiently high value whereby various intermediate positions of the carriage 14 may be maintained if use of the iron sight 18 is desired, the position of the knurled collar 78 being maintained by the engagement of the spring clip 104 therewith.

The carriage 14 may be removed readily by rotating the knurled collar 78 until sufficient axial displacement of the plunger 71 occurs to permit complete disengagement of the conical journal 69 from the conical socket defined by the bearing surface 68. The carriage 14 may be installed be reversing this procedure and the proper alignment of the line of sight of the telescope 16 may be obtained by tightening the collar 78 slightly whereby the conical journals will become centered relative to the conical bearing surfaces and return the telescope 16 to its original position. It will be apparent, therefore, that the carriage 14 may be removed and installed repeatedly without impairing the accuracy of alignment of the telescope 16, since the action of the various conical bearings insures exact duplication of the prescribed alignment. Furthermore, as the various components of the bearing assembly 17 becomes worn after prolonged use, the wear is automatically compensated by increasing the axial displacement of the plunger 71. Since the axis of the bearing assembly 17 is preferably parallel to the axis of the bore of the rifle 13, the recoil of the latter merely tends to seat the various conical bearings more securely and cannot affect the alignment of the telescope 16.

The inherent rigidity of the bridge-type construction of the single-piece base 11 and carriage 14 further insures constant alignment of the telescope 16 with the bore of the rifle 13. This feature provides a positive and reliable means of attaching the telescopic sight mount to the rifle 13 and provides a dependable support for the telescope 16. The installation of the base 11 is appreciably simplified, since it may be installed as an integral unit without the necessity of aligning various components thereof, a disadvantage inherent in many conventional mounts.

The base 11 may be adapted for application to any firearm without modifying the bearing assembly 17. This feature permits the use of a single carriage 14 and telescopes 16 with a large number of firearms by the simple expedient of transferring the carriage 14 from one to another, a base 11 being provided on each for the reaction of the single carriage 14. The mechanism previously described makes removal and installation of the carriage 14 a matter requiring but a few moments.

Although we have described an exemplary embodiment of our invention, we do not intend to be limited to the specific disclosures contained herein since those proficient in the art will recognize various changes, substitutions, and modifications of our underlying inventive concept; we hereby reserve the right to all such changes, substitutions, and modifications as properly come within the scope of our appended claims.

We claim as our invention:

1. In a device for mounting a telescopic sight on a gun, the combination of: a one-piece base adapted to be rigidly attached to the gun; a one-piece carriage adapted to receive and rigidly retain the telescopic sight; and centering means carried by said base and said carriage and providing an axis of rotation for said carriage for pivotally connecting said carriage to said base, said centering means comprising a pair of conical journals and a pair of conical bearings which are adapted to receive said journals, respectively, said bearings and said journals being spaced apart relative to said base and said carriage along said axis of rotation, said bearings facing each other and said centering means including means connecting said journals for increasing the spacing therebetween to seat said journals in said bearings, respectively.

2. In a device for mounting a telescopic sight on a gun, the combination of: a one-piece base member adapted to be rigidly attached to the gun and a one-piece carriage member adapted to receive and rigidly retain the telescopic sight, one of said members being provided with a pair of axially spaced, aligned openings therein and the other of said members being provided with a pair of axially spaced, aligned holes therein which are adapted to register with said openings, respectively; and centering means carried by said base member and said carriage member and disposed in said openings and said holes for pivotally connecting said carriage member to said base member, said centering means including a pair of axially spaced conical bearings which face each other and including a pair of axially spaced conical journals adapted to seat in said bearings, respectively, and said centering means including means connecting said journals for increasing the spacing therebetween to seat said journals in said bearings, respectively.

3. In a device of the character described, the combination of: first and second members; a guideway carried by said first member and providing an axis; a first conical bearing carried by said first member on said axis; a second conical bearing carried by said second member on said axis, said first and second conical bearings facing each other; a first conical journal carried by said first member on said axis and adapted to engage said first conical bearing; a second conical journal carried by said first member in said guideway and movable in said guideway into engagement with said second conical bearing; and means connecting said first and second conical journals for moving said second conical journal in said guideway into engagement with said second conical bearing.

4. In a device of the character described, the combination of: first and second members; a guideway carried by said first member and providing an axis; a first conical bearing carried by said first member on said axis; a second conical bearing carried by said second member on said axis, said first and second conical bearings facing each other; a first conical journal carried by said first member on said axis and adapted to engage said first conical bearing; a second conical journal carried by said first member in said guideway and movable in said guideway into engagement with said second conical bearing; and means comprising an element rigidly connected to said first conical journal and threadedly connected to said second conical journal for moving said second conical journal in said guideway into engagement with said second conical bearing.

5. In a device of the character described, the combination of: first and second members; a guideway carried by said first member and providing an axis; a first conical bearing carried by said first member on said axis; a second conical bearing carried by said second member on said axis, said first and second conical bearings facing each other; a first conical journal carried by said first member on said axis and adapted to engage said first conical bearing; a second conical journal carried by said first member in said guideway and movable in said guideway into engagement with said second conical bearing; and means comprising a screw rigidly connected to said first conical journal and threaded into said second conical journal for moving said second conical journal in said guideway into engagement with said second conical bearing.

6. In a device of the character described, the combination of: first and second members; a guideway carried by said first member and providing an axis; a first conical bearing carried by said first member on said axis; a second conical bearing carried by said second member on said axis, said first and second conical bearings facing each other; a first conical journal carried by said first member on said axis and adapted to engage said first conical bearings; a second conical journal carried by said first member in said guideway and movable in said guideway into engagement with said second conical bearing; means connecting said first and second conical journals for moving said second conical journal in said guideway into engagement with said second conical bearing; a third conical bearing carried by one of said members on said axis; and a third conical journal carried by the other of said members on said axis and adapted to engage said third conical bearing.

FRANK A. PACHMAYR.
ROGER HOWARD STOKES.

REFERENCES CITED

The following references are of record in the file of this patent:

UNITED STATES PATENTS

| Number | Name | Date |
|---|---|---|
| 317,460 | Joyner | May 5, 1885 |
| 440,574 | M. Merritt | Nov. 11, 1890 |
| 786,509 | G. Merritt | Apr. 4, 1905 |
| 1,083,288 | Lowe | Jan. 6, 1914 |
| 2,208,913 | Unertl | July 23, 1940 |
| 2,369,148 | Langhorst | Feb. 13, 1945 |
| 2,385,176 | White | Sept. 18, 1945 |
| 2,396,404 | Williams | Mar. 12, 1946 |
| 2,451,266 | Whittemore | Oct. 12, 1948 |

FOREIGN PATENTS

| Number | Country | Date |
|---|---|---|
| 142,545 | Germany | 1903 |
| 204,399 | Great Britain | 1923 |
| 468,237 | Great Britain | 1937 |